United States Patent
Pajak

(10) Patent No.: US 9,355,468 B2
(45) Date of Patent: May 31, 2016

(54) SYSTEM, METHOD, AND COMPUTER PROGRAM PRODUCT FOR JOINT COLOR AND DEPTH ENCODING

(71) Applicant: NVIDIA Corporation, Santa Clara, CA (US)

(72) Inventor: Dawid Stanislaw Pajak, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 14/498,976

(22) Filed: Sep. 26, 2014

(65) Prior Publication Data

US 2015/0093024 A1    Apr. 2, 2015

Related U.S. Application Data

(60) Provisional application No. 61/883,917, filed on Sep. 27, 2013.

(51) Int. Cl.
| | | |
|---|---|---|
| G06K 9/00 | (2006.01) | |
| G06T 9/00 | (2006.01) | |
| H04N 19/597 | (2014.01) | |

(52) U.S. Cl.
CPC ............... *G06T 9/00* (2013.01); *H04N 19/597* (2014.11)

(58) Field of Classification Search
None
See application file for complete search history.

(56) References Cited

U.S. PATENT DOCUMENTS

| | | | |
|---|---|---|---|
| 2007/0024614 A1* | 2/2007 | Tam et al. | 345/419 |
| 2007/0262985 A1* | 11/2007 | Watanabe et al. | 345/420 |
| 2011/0122225 A1* | 5/2011 | Kim et al. | 348/42 |
| 2011/0317912 A1* | 12/2011 | Oh et al. | 382/166 |
| 2012/0002863 A1* | 1/2012 | Lim et al. | 382/154 |
| 2013/0222377 A1* | 8/2013 | Bruls et al. | 345/419 |
| 2013/0329008 A1* | 12/2013 | Takahashi et al. | 348/43 |
| 2014/0192154 A1* | 7/2014 | Jeong et al. | 348/43 |
| 2014/0368610 A1* | 12/2014 | Grangetto et al. | 348/43 |
| 2015/0124867 A1* | 5/2015 | Jaeger et al. | 375/240.02 |

OTHER PUBLICATIONS

Bradshaw et al., "Sensitivity to Horizontal and Vertical Corrugations Defined by Binocular Disparity," Vision Research 39, 1999, pp. 3049-3056.
Cormack et al., "Interocular Correlation, Luminance Contrast and Cyclopean Processing," Vision Research, vol. 31, No. 12, 1991, pp. 2195-2207.
Daly et al., "Perceptual Issues in Stereoscopic Signal Processing," IEEE Transactions on Broadcasting, vol. 57, No. 2, Jun. 2011, pp. 347-361.
Durand et al., "Fast Bilateral Filtering for the Display of High-Dynamic-Range Images," ACM Transactions on Graphics, vol. 21, No. 3, 2002, pp. 257-266.
Domanski et al., "Coding of Multiple Video+Depth Using HEVC Technology and Reduced Representations of Side Views and Depth Maps," In Picture Coding Symposium (PCS), 2012, pp. 1-4.

(Continued)

*Primary Examiner* — Li Liu
(74) *Attorney, Agent, or Firm* — Zilka-Kotab, PC

(57) ABSTRACT

A system and method are provided for performing joint color and depth encoding. Color data and depth data for an image is received. Based on the color data, confidence values are computed for the depth data and the depth data is encoded based on the confidence values to represent a correlated portion of the depth data and a decorrelated portion of the depth data. In one embodiment, the depth data comprises per-pixel vergence angles.

18 Claims, 7 Drawing Sheets

(56) References Cited

OTHER PUBLICATIONS

Didyk et al., "Adaptive Image-Space Stereo View Synthesis," Vision, Modeling and Visualization, 2010, pp. 1-8.
Didyk et al., "A Perceptual Model for Disparity," ACM Transactions on Graphics, vol. 30, No. 4, 2011, pp. 1-9.
Didyk et al., "A Luminance-Contrast-Aware Disparity Model and Applications," ACM Transactions on Graphics, vol. 31, No. 6, 2012, pp. 1-10.
Eisert et al., "Rate-Distortion Efficient Video Compression Using A 3D Head Model," International Conference on mage Processing, 1999, pp. 1-5.
Fehn, C., "Depth-Image-Based Rendering (DIBR), Compression, and Transmission for a New Approach on 3D-TV," In Stereoscopic Displays and Virtual Reality Systems XI, vol. 5291, 2004, pp. 93-104.
Hewage et al., "Quality Evaluation of Color Plus Depth Map Based Stereoscopic Video," IEEE Journal of Selected Topics in Signal Processing, vol. 3, No. 2, 2009, pp. 304-318.
Kim et al., "Multi-Perspective Stereoscopy from Light Fields," ACM Transactions on Graphics, vol. 30, No. 6, 2011, pp. 1-10.
Krisfinamurthy et al., "Compression and Transmission of Depth Maps for Image-Based Rendering," International conference on Image Processing, 2001, pp. 1-4.
Kopf et al., "Joint Bilateral Upsampling," ACM Transactions on Graphics, vol. 26, No. 3, Jul. 2007, pp. 1-5.
Lambooij et al., "Visual Discomfort and Visual Fatigue of Stereoscopic Displays: A Review," J Imaging Science and Technology, vol. 53, No. 3, May-Jun. 2009, pp. 030201 1-14.
Lang et al., "Nonlinear Disparity Mapping for Stereoscopic 3D," ACM Transactions on Graphics, vol. 29, 2010, pp. 1-10.
Legge et al., "Contrast Masking in Human Vision," Journal of the Optical Society of America, vol. 70, No. 12, Dec. 1980, pp. 1458-1471.
Maitre et al., "Joint Encoding of the Depth Image Based Representation Using Shape-Adaptive Wavelets," International Conference on Image Processing, 2008, pp. 1-4.
Mantiuk et al., "Comparison of Four Subjective Methods for Image Quality Assessment," Computer Graphics Forum, vol. 31, No. 8, 2012, pp. 2478-2491.
Masia et al., "Display Adaptive 3D Content Remapping," Computers Graphics, vol. 37, No. 8, 2013, pp. 1-14.
Merkle et al., "The Effects of Multiview Depth Video Compression on Multiview Rendering," Signal Processing: Image Communication, vol. 24, 2009, pp. 73-88.
Merkle et al., "3D Video: Depth Coding Based on Inter-Component Prediction of Block Partitions," In Picture Coding Symposium (PCS), May 7-9, 2012, pp. 149-152.
Merkle et al., "Video Plus Depth Compression for Mobile 3D Services," In 3DTV Conference: The True Vision—Capture, Transmission and Display of 3D Video, 2009, pp. 1-4.
Oh et al., "Depth Reconstruction Filter and Down/Up Sampling for Depth Coding in 3-D Video," IEEE Signal Processing Letters, vol. 16, No. 9, Sep. 2009, pp. 747-750.
Omer et al., "Color Lines: Image Specific Color Representation," Computer Vision and Pattern Recognition, Proceedings of the 2004 IEEE Computer Society Conference on, vol. 2, 2004, pp. 1-8.
Oskam et al., "Oscam—Optimized Stereoscopic Camera Control for Interactive 3D," ACM Transactions on Graphics, vol. 30, No. 6, 2011, pp. 1-8.
Pajak et al., "Scalable Remote Rendering with Depth and Motion-Flow Augmented Streaming," Computer Graphics Forum (Proceedings of Eurographics) vol. 30, No. 2, 2011, pp. 1-10.
Park et al., "Depth-Image-Based Rendering for 3DTV Service Over T-DMB," Signal Processing: Image communication, vol. 24, No. 1, 2009, pp. 122-136.
Pece et al., "Adapting Standard Video Codecs for Depth Streaming," In Proceedings of Joint Virtual Reality conference of EuroVR (EGVE), 2011, pp. 1-8.
Richardson, I. E., "The H.264 Advanced Video Compression Standard," 2nd Edition, John Wiley and Sons, Ltd., Aug. 2010, pp.
Richardt et al., "Coherent Spatiotemporal Filtering, Upsampling and Rendering of RGBZ Videos," Computer Graphics Forum, vol. 31, No. 2, 2012, pp. 1-10.
Rosenholtz et al., "Perceptual Adaptive JPEG Coding," In IEEE International Conference on Image Processing, vol. 1, 1996, pp. 1-4.
Shibata et al., "The Zone of Comfort: Predicting Visual Discomfort with Stereo Displays," Journal of Vision, vol. 11, No. 8, 2011, pp. 1-29.
Schuon et al., "LidarBoost: Depth Superresolution for ToF 3D Shape Scanning," IEEE Conference on Computer Vision and Pattern Recognition, 2009, pp. 1-8.
Solomon et al., "Visibility of DCT Basis Functions: Effects of Contrast Masking," IEEE Data Compression conference, 1994, pp. 361-370.
Tomasi et al., "Bilateral Filtering for Gray and Color Images," IEEE International Conference on Computer Vision, 1998, pp. 1-8.
Vetro et al., "3D-TV Content Storage and Transmission," IEEE Transactions on Broadcasting—Special Issue on 3D-TV Horizon: Contents, Systems and Visual Perception, vol. 57, No. 2, Jan. 2011, pp. 1-12.
Watson, A., "DCT Quantization Matrices Visually Optimized for Individual Images," In Human Vision, Visual Processing, and Digital Display IV, Proc. SPIE 1913-14, 1993, pp. 1-15.
Watson et al., "Quest: A Bayesian Adaptive Psychometric Method," Perception & Psychophysics, vol. 33, No. 2, 1983, pp. 113-120.
Wildeboer et al., "Color Based Depth Up-Sampling for Depth Compression," In 28th Picture Coding Symposium (PCS), Dec. 8-10, 2010, pp. 170-173.
Wong et al., "Stereoacuity at Distance and Near," Optometry & Vision Science, vol. 79, No. 12, 2002, pp. 771-778.
7ENG et al., "An Overview of the Visual Optimization Tools in JPEG 2000," Signal Processing: Image Communication, Journal 17, No. 1, 2002, pp. 85-104.
Zitnick et al., "High-Quality Video View Interpolation Using a Layered Representation," ACM Transactions on Graphics, vol. 23, No. 3, 2004, pp. 1-9.
Howard et al., "Seeing in Depth," vol. 2: Depth Perception, I Porteous, 2002, pp. 1-626.

* cited by examiner

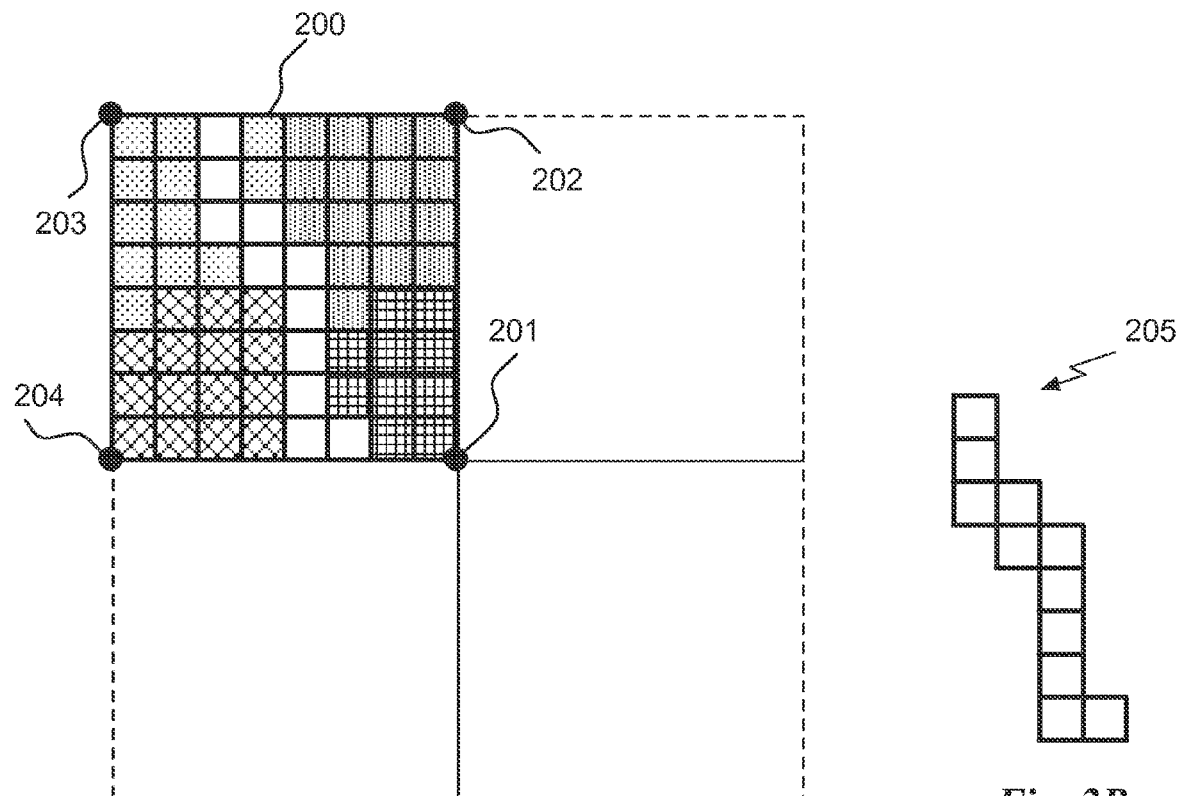
*Fig. 2A*
*Fig. 2B*
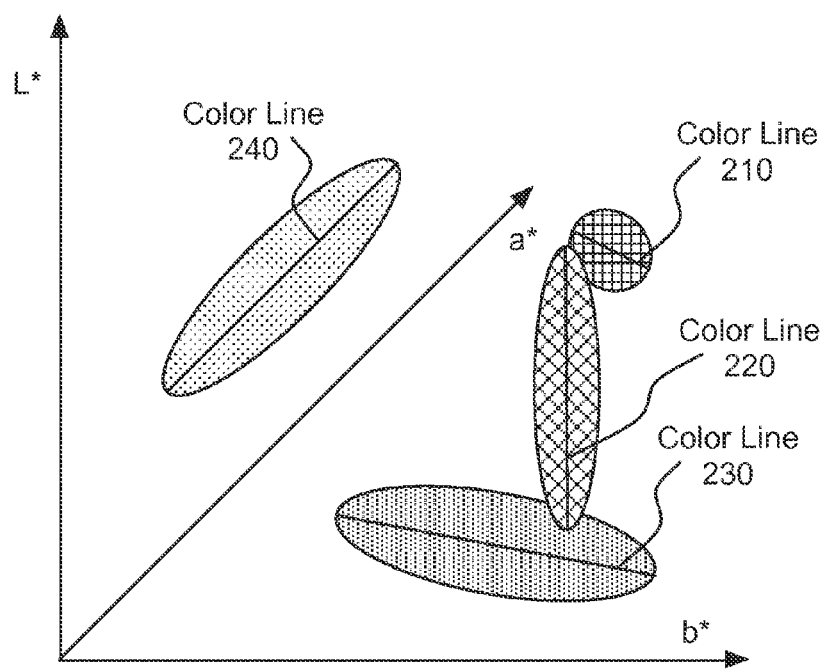
*Fig. 2C*

SYSTEM, METHOD, AND COMPUTER PROGRAM PRODUCT FOR JOINT COLOR AND DEPTH ENCODING

CLAIM OF PRIORITY

This application claims the benefit of U.S. Provisional Application No. 61/883,917 titled "A Method of Joint Color and Depth Video Compression For Stereo Applications," filed Sep. 27, 2013, the entire contents of which is incorporated herein by reference.

FIELD OF THE INVENTION

The present invention relates to data processing, and more specifically to joint color and depth data encoding.

BACKGROUND

State-of-the-art video coding standards, such as H.264 achieve high compression efficiency based on two important assumptions. First, the encoded data is assumed to come from spatially and temporally sampled natural (real world) scenes. Such signals are mostly continuous in space and, due to relatively high frame rates, the change of information from one frame to the next is usually small—it is mostly due to camera or object motion. Video encoders exploit this spatio-temporal redundancy by only encoding data that cannot be derived or predicted from spatial or temporal neighborhoods.

Unfortunately, compression tools that are designed with the above assumptions in mind are sub-optimal for depth coding. Their use, even in high-bandwidth scenarios, can lead to subpar three-dimensional (3D) video quality. Approaches specific to computer-graphics applications can be prohibitively expensive in terms of bandwidth requirements. Thus, there is a need for improving coding of depth data to improve compression rates and reduce the bandwidth needed to transmit the depth data.

SUMMARY

A system and method are provided for performing joint color and depth encoding. Color data and depth data for an image is received. Based on the color data, confidence values are computed for the depth data and the depth data is encoded based on the confidence values to represent a correlated portion of the depth data and a decorrelated portion of the depth data. In one embodiment, the depth data comprises per-pixel vergence angles.

BRIEF DESCRIPTION OF THE DRAWINGS

FIG. 2A illustrates a block of pixels of an image, in accordance with one embodiment.

FIG. 2B illustrates decorrelated pixels within the block of pixels shown in FIG. 2A, in accordance with one embodiment.

FIG. 2C illustrates color lines corresponding to the pixels within the block of pixels shown in FIG. 2A, in accordance with one embodiment.

DETAILED DESCRIPTION

Conventional depth video compression uses video codecs designed for color images. Given the performance of current encoding standards, this solution seems efficient. However, such an approach suffers from many issues stemming from discrepancies between depth and light perception. Because the depth may be well correlated with the color, the depth can be encoded and reconstructed on the decoder side using the color to produce 3D video with good quality in terms of both depth and color. The depth encoding technique can easily be integrated into existing encoders/decoders to significantly improve compression, and compression efficiency may be improved without sacrificing the visual quality of depth of rendered content, as well as the output of depth-reconstruction algorithms or depth cameras.

Figure 1A:
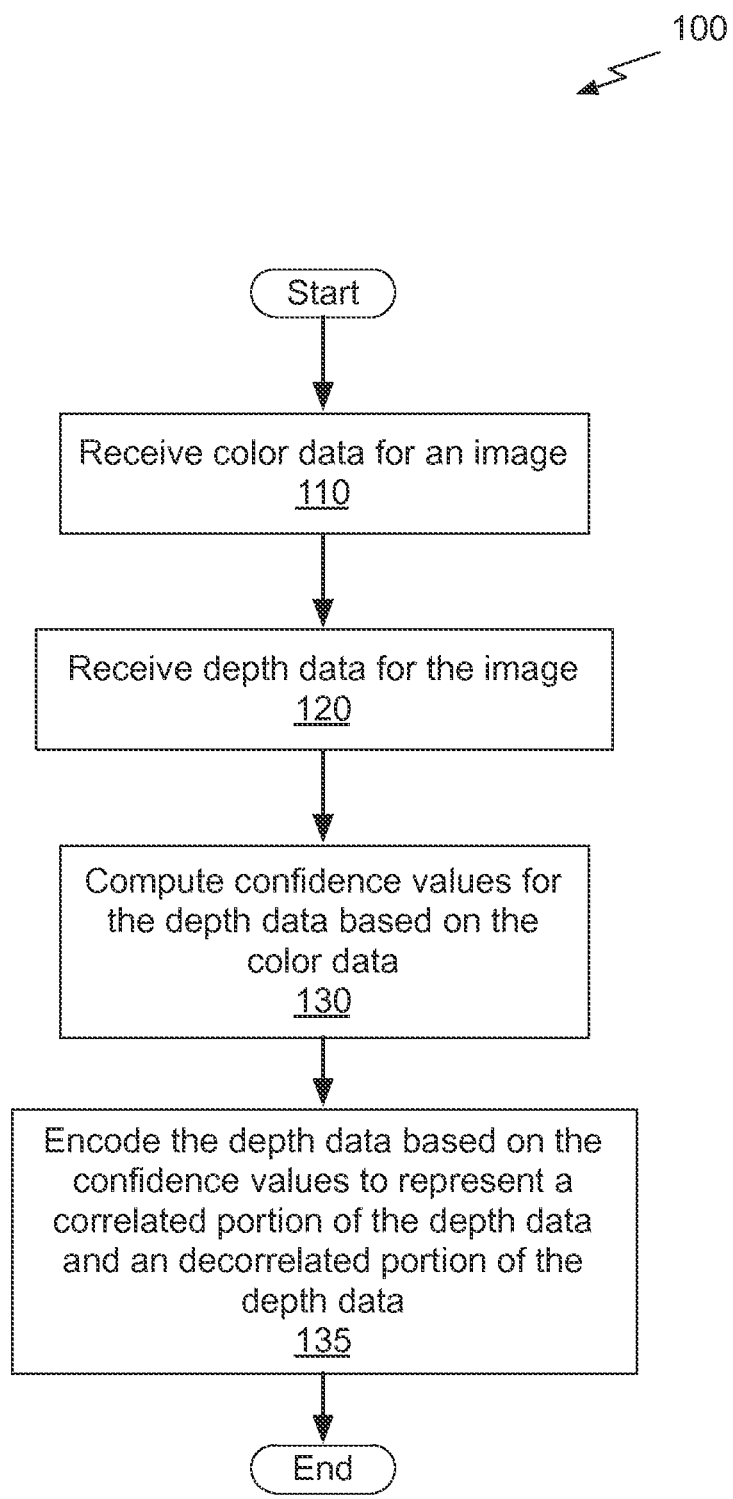
FIG. 1A illustrates a flowchart of a method for performing joint color and data encoding, in accordance with one embodiment.

FIG. 1A illustrates a flowchart of a method 100 for performing joint color and depth encoding. At operation 110, color data is received. In one embodiment, a color value comprising three color components is received for each pixel in the image. The two or more separate channels may vary independently. In one embodiment, the color data is represented in an opponent color space. CIELAB color space is an opponent color space and RGB color space is not an opponent color space. The key property of an opponent color space is a statistical decorrelation of color channels, which allows an encoder to compress the color channels independently and focus the encoding on perceptually significant information.

At operation 120, depth data for the image is received. In one embodiment, the depth data is represented as per-pixel vergence angles. A vergence angle is used in stereo applications and can be considered a measure of physically (and perceptually) significant depth. More specifically, a vergence angle is the angle between two ray where the first ray starts at a point on an object and ends at a viewer's left eye and the second ray starts at the point and ends at the viewer's right eye. Thus, a smaller vergence angle corresponds to increased distance from the viewer (i.e., increased depth) and a larger vergence angle corresponds to decreased distance from the viewer (i.e., decreased depth). Vergence angles may be considered to be depth values or depth data for the purposes of the following description. The depth data may be represented in a fixed-point format or in a floating-point format. The color data and/or the depth data may be stored in a memory.

At operation 130, based on the color data, confidence values are computed for the depth data. In one embodiment, the per-pixel color data C for the image is sampled at one position in a k×k block and the confidence values indicate how well the sampled color data represents each color data C inside the k×k block. In one embodiment, k≥4. For example, when color values in a 4×4 block do not vary or vary only by a small amount, a single sampled color value is a good representation of the color values of all of the pixels in the k×k block. A high confidence value indicates correlation between the sampled color data and the color data and a low confidence value indicates decorrelation between the sampled color data and the color data.

In one embodiment, depth data D for an image having a width and height is downsampled by a factor k in width and height to generate sampled depth data. For example, a depth value for a single pixel in a block of pixels may be selected as the sampled depth data for a block of pixels. Assuming $\hat{d}$ represents sampled depth data for an image, when k=4, each depth value in $\hat{d}$ represents a 4×4 block of depth values of D. Formally, $\hat{d}(i):=D(k \cdot i)$, where I(i) is the pixel value of an image I at pixel position i. The sampled depth data and/or the color data may be stored in a memory. Because the depth values tend to correspond to the color values, the confidence values generated based on the sampled color data also indicate correlation and decorrelation between the sampled depth data $\hat{d}$ and the depth data D.

In addition to computing confidence values for the sampled color data for the particular k×k block, at operation 130 confidence values are computed using the sampled color data of neighboring k×k blocks. In one embodiment, for each pixel in the k×k block, additional confidence values are computed using the sampled color data for 3 neighboring k×k blocks, when the particular k×k block and the 3 neighboring k×k blocks form a larger 2k×2k block. The depth data for each pixel in the k×k block may then be defined as a weighted average of sampled depth data for the particular k×k block and sampled depth data for the neighboring k×k blocks, where the weights for each pixel are the confidence values that are computed based on the color data.

At operation 135, the depth data is encoded based on the confidence values to represent a correlated portion of the depth data and a decorrelated portion of the depth data. The correlated portion of the depth data for a block of pixels is represented by the sampled depth value for the block. A first approximation of the depth data for the block of pixels may be reconstructed using the sampled depth value and the confidence values. However, some details in the block may not be represented by the sampled depth value and the confidence values. The decorrelated portion of the depth data for the block of pixels is represented by a different depth value that corresponds to the details. In one embodiment, the decorrelated portion of the depth data is represented by a residual depth value. In one embodiment, the sampled depth data $\hat{d}$ for each block of an image are inserted into a first component channel and residual depth values for each block of the image are inserted into a second component channel. The component channels may be two color component channels.

In one embodiment, the residual depth value may be computed based on the confidence values $w_{sum}(j)$. First, the confidence values are used to compute complementary confidence values $w_c(j)$ that indicate decorrelation between the sampled color data and the color data. Second, the complementary confidence values are used to compute a representative decorrelated depth value as a weighted sum of the per-pixel depth data for the block, where the weight used for each pixel's depth value is the complementary confidence value $w_c(j)$. In one embodiment, the residual depth value for a block is then computed as a difference between the sampled depth value and the representative decorrelated depth value of the depth data. Thus, in one embodiment, the encoded depth data 165 for a block is two values (e.g., a single sampled depth value and the residual depth value) compared with k×k depth values prior to encoding.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
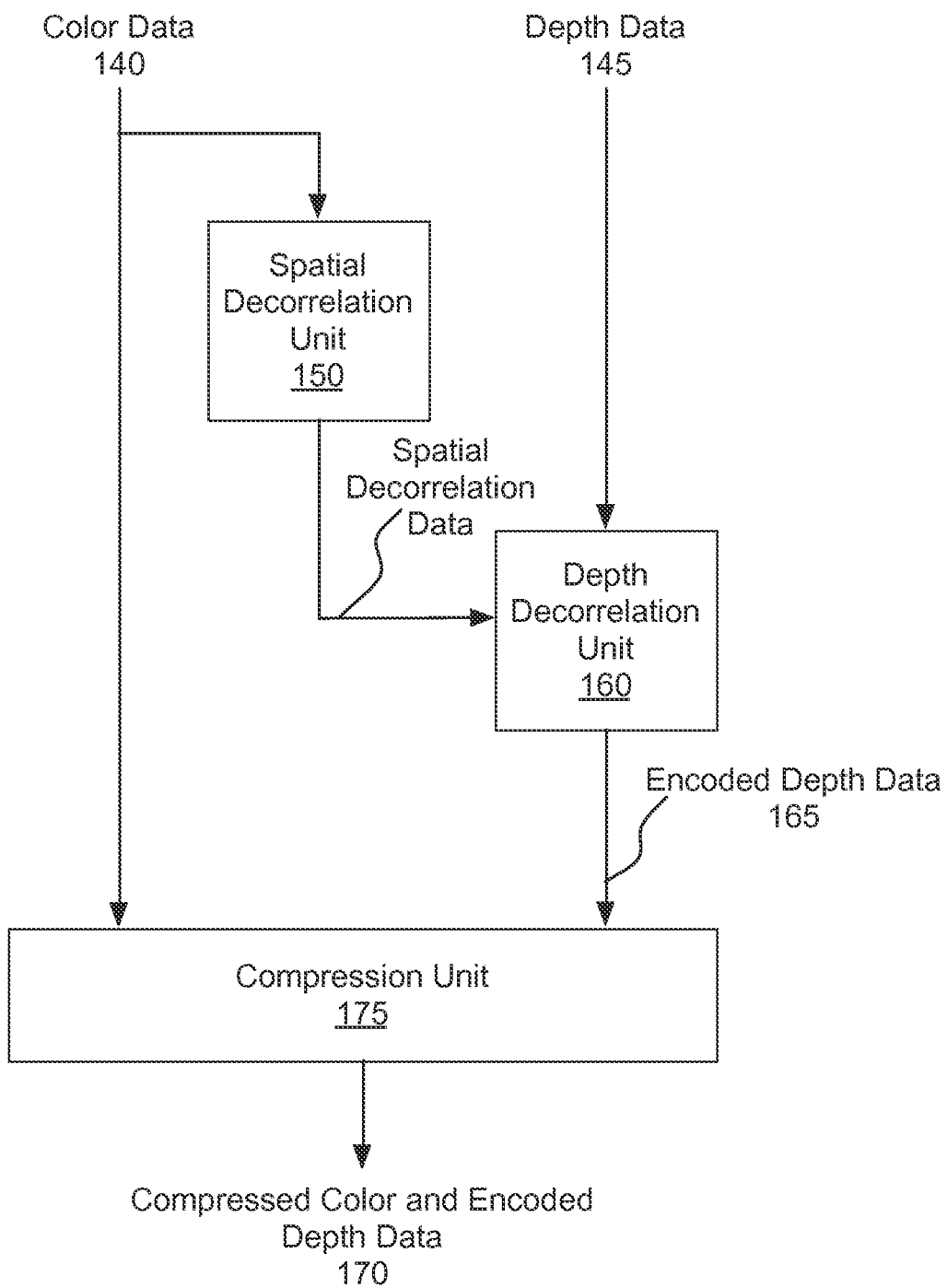
FIG. 1B illustrates a block diagram for performing joint color and data encoding, in accordance with one embodiment.

FIG. 1B illustrates a block diagram for performing joint color and data encoding, in accordance with one embodiment. Color data 140 is input to a spatial decorrelation unit 150 and a compression unit 175. In one embodiment, the spatial decorrelation unit 150 is configured to sample the color data 140 to produce a sampled color value for each block of pixels and to generate per-pixel confidence values based on the color data 140 and the sampled color values. The confidence values for a block of pixels may be used to identify the pixels that are correlated in terms of color data and the pixels that are decorrelated in terms of color data. The complementary confidence values for the block of pixels may be computed based on the confidence values for the block of pixels. Additionally, a complementary confidence mask may be computed for the block of pixels based on the complementary confidence values. The complementary confidence mask indicates the particular pixels in the block having decorrelated color data. In other words, the complementary confidence mask indicates any pixels in the block that have low confidence values and whose color or depth value cannot be accurately reconstructed from the sampled color value or sampled depth value, respectively. As previously explained, the pixels which are decorrelated in terms of color are assumed to be decorrelated in terms of depth.

The spatial decorrelation data that is output by the spatial decorrelation unit 150 includes at least one of the confidence values, the complementary confidence mask, and the complementary confidence values $w_c(j)$ for each block of pixels. Importantly, in one embodiment, the spatial decorrelation data is generated using only the color data. In one embodiment, the spatial decorrelation data that is output to the depth decorrelation unit 160 is only the confidence values that are needed to generate the residual depth value for each block of pixels. In another embodiment, the spatial decorrelation data that is output to the depth decorrelation unit 160 is only the complementary confidence values that are needed to generate the residual depth value for each block of pixels.

In one embodiment, the compression unit 175 outputs the color data without compressing the color data as a color portion of the compressed color and encoded depth data 170. In another embodiment, the compression unit 175 is configured to compress the color data to produce the color portion of the compressed color and encoded depth data 170. Persons skilled in the art will understand that one or more known compression techniques, such as H.264 may be employed by the compression unit 175.

Depth data 145 is input to the depth decorrelation unit 160. In one embodiment, the depth decorrelation unit 160 is configured to downsample the depth data 145 to produce sampled depth data as a correlated portion of the encoded depth data 165. In one embodiment, a single sampled depth value is produced for each block of pixels. The depth decorrelation unit 160 also receives the spatial decorrelation data corresponding to the color data 140 from the spatial decorrelation unit 150. The depth decorrelation unit 160 computes the residual depth value for the block using the depth data, the sampled depth value, and the spatial decorrelation data and outputs the residual depth value as a decorrelated portion of the encoded depth data 165. The encoded depth data 165 that is output by the depth decorrelation unit 160 includes the residual depth values and the sampled depth values.

In one embodiment, the compression unit 175 is configured to output the encoded depth data 165 as a depth portion of the compressed color and encoded depth data 170 that is output by the compression unit 175. In another embodiment, the compression unit 175 is configured to compress the encoded depth data 165 to produce the depth portion of the compressed color and encoded depth data 170.

One or more of the spatial decorrelation unit 150, depth decorrelation unit 160, and compression unit 175 may be included within a processing unit. The functions performed by one or more of the spatial decorrelation unit 150, depth decorrelation unit 160, and compression unit 175 may be performed by a general purpose processing unit or dedicated circuitry. One or more of the color data 140, depth data 145, spatial decorrelation data, encoded depth data 165, sampled depth data, and compressed color and encoded depth data 170 may be stored in a memory.

FIG. 2A illustrates a block of pixels 200 of an image, in accordance with one embodiment. A color image C (i.e., color values for the image) is partitioned into blocks $C_i$. Similarly, a depth image D (i.e., depth values for the image), of resolution $d_{width} \times d_{height}$, is partitioned into blocks $D_i$. A block with index $i \in \{(x,y) \in Z^2: 0 \leq x < \lfloor d_{width}/k \rfloor \wedge 0 \leq y < \lfloor d_{height}/k \rfloor \}$ represents the pixels $\{k \cdot i + (x,y):(x,y) \in Z^2, 0 \leq x < k \wedge 0 \leq y < k\}$ of the image. The Depth image D may be reconstructed block by block using the spatial decorrelation data generated using only the color data and the encoded depth data 165, as described further herein.

As shown in FIG. 2A, the block of pixels 200 is 8×8 pixels, so k=8. Each pattern represents a different color. When the image is partitioned into blocks, a sampled color and a sampled depth value is computed for each block of pixels 200. For example, a sampled depth value and a sampled color value for the block of pixels 200 may be associated with a position 203 in the upper left corner of the block of pixels 200. Sampled depth values and Sampled color values that are computed for neighboring blocks of pixels may be associated with positions 202. 203, and 204. Thus, there are four sampled color values available to generate the spatial decorrelation data and four sampled depth values available to reconstruct the depth values of individual pixels in the block of pixels 200. Specifically, the sampled depth values associated with the positions 201, 202, 203, and 204 may be used to reconstruct the depth values for the block of pixels 200.

An approximation of the depth data for each pixel in the block of pixels 200 may be reconstructed as a weighted function of the sampled depth values associated with the positions 201, 202, 203, and 204. However, small features inside the block of pixels 200 may not always be well represented by the sampled depth values associated with the positions 201, 202, 203, and 204. The spatial decorrelation data that are generated from the color data for the block of pixels 200 may indicate decorrelated pixels corresponding to small features that may not be well represented. The residual depth value for each block of pixels provides additional information to reconstruct the depth data for the decorrelated pixels.

As shown by the patterns in FIG. 2A, colors of the pixels in the upper left corner of the block of pixels 200 correlates with a color value at the position 203, colors of the pixels in the lower left corner of the block of pixels 200 correlates with the color value at the position 204, colors of the pixels in the upper right corner of the block of pixels 200 correlates with the color value at the position 202, and colors of the pixels in the lower right corner of the block of pixels 200 correlates with the color value at the position 201.

FIG. 2B illustrates decorrelated pixels 205 within the block of pixels 200 shown in FIG. 2A, in accordance with one embodiment. In the example shown in FIG. 2A, the decorrelated pixels 205 do not correlate with any combination of the color values at positions 201, 202, 203, and 204. The decorrelated pixels 205 may be indicated by a complementary confidence mask. During encoding, a representative decorrelated depth value and residual depth value may be computed to represent the decorrelated pixels 205. The residual depth value for the block of pixels 200 may be computed as the difference between the sampled depth value associated with the position 203 and the representative decorrelated depth value. Thus, a residual depth value is associated with each sampled depth value. During reconstruction of the depth data, the residual depth value and the spatial decorrelated data may be used to reconstruct depth values for the pixels indicated by the complementary confidence mask.

The residual depth value provides one additional sampled depth value for each block of pixels 200. In one embodiment, more than one additional sampled depth value is provided for each block of pixels 200 by encoding additional residual depth values that represent other decorrelated portions of the depth data for the block of pixels 200.

FIG. 2C illustrates color lines corresponding to correlated pixels within the block of pixels 200 shown in FIG. 2A, in accordance with one embodiment. The color value for each pixel in the block of pixels 200 may be mapped to a CIELAB color space having coordinates L*, a*, and b*. Color values for pixels that are correlated form clusters. In many cases, the color value at a position p within a block of pixels can be quite different from neighboring pixels, even when the same surface covers the neighboring pixels. However, local image structures tend to exhibit large variations only in one specific color channel (e.g., brightness), but gradual changes in other color channels, producing the color lines. The color lines may be used to determine a better range weighting to reconstruct the depth values of the image.

A color line may be computed as the first eigenvector over weighted pixel distribution in the CIELAB color space. Each of the four downsampled color values in the block of pixels 200 corresponds to a color line (i.e., first eigenvector) shown in FIG. 2C. Each color line 210, 220, 230, and 240 is positioned along the major axis of a cluster of pixel colors. The pixel colors associated with each color line lie within the oblong shape surrounding the respective color line. For example, the color line 240 corresponds to the sampled color value 203 in the upper left corner of the block of pixels 200. The color line 210 corresponds to the sampled color value 201 in the lower right corner of the block of pixels 200. The color line 220 corresponds to the sampled color value 204 in the lower left corner of the block of pixels 200. The color line 230 corresponds to the sampled color value 202 in the upper right corner of the block of pixels 200. The decorrelated pixels 205 indicated by the complementary confidence mask do not correspond to one of the color lines 210, 220, 230, or 240. The representative decorrelated depth value computed for the decorrelated pixels 205 effectively corresponds to an additional color line (not shown in FIG. 2C).

In one embodiment, local color line model (LCLM) is introduced where an anisotropic distance function is derived for a position p based on the color-line orientation. The anisotropic distance describes the individual pixel colors more accurately than a standard uniform distance. An approximation of a PCA of the color values in CIELAB color space is computed in an k×k-pixel neighborhood around p. Using the inverse of the eigenvalues along the axis defined by the eigenvectors, leads to a distance that is virtually shrunk along the color line.

Instead of computing a full principal component analysis (PCA), a more efficient approximation may be computed by deriving the first eigenvector of the PCA via a power iteration method. The first eigenvector is described by $Q_{n+1}=MQ_n/\|MQ_n\|$, where M is the covariance matrix and Q is the current eigenvector estimate. Three iterations are usually sufficient to find the first eigenvector, and, hence, its eigenvalue $\lambda_p$. We then define $$\Lambda := \begin{pmatrix} \lambda_p & 0 & 0 \\ 0 & \sigma_2^2 & 0 \\ 0 & 0 & \sigma_2^2 \end{pmatrix},$$

where $\sigma_2^2$ is the variance of the pixel colors distances to the line defined by the eigenvector and average color $\mu_p$. Next, we set $T_p^{-1}:=V_p \Lambda_p^{-1} V_p^T$, where $V_p$ is an orthogonal matrix containing the first eigenvector in the first row. $T_p^{-1}$ is then used in the definition of the confidence value (i.e., weighting function) $h_p$ by involving the Mahalanobis distance $$h_p(X) := e^{-(\sigma_c^{-1}\sqrt{(X-\mu_p)^T T_p^{-1}(X-\mu_p)})^2},$$

where $\sigma_c$ is a constant that controls the tradeoff with respect to the spatial weighting function (in one embodiment, 0.1 is used for all examples). The confidence value $h_p(X)$ is computed for each pixel (e.g., pixel at position X) inside the block p and is defined as a distance metric of a pixel color to local color line model that characterizes color data of the sample position within block p. With this construction, the color lines are assumed to have a shape in color space that is rotationally invariant around a center line. Further, the full PCA computation is avoided which makes the technique very fast to compute.

In one embodiment, robustness and quality are increased even further by excluding outliers when estimating each color line. When blocks of pixels contain several boundaries of significantly different surfaces, there may be more outliers. In one embodiment, a weighted power iteration may be used when determining Q, $\lambda_p$, and $\mu_p$ to exclude the outliers (i.e., decorrelated pixels). In other words, each pixel contributes differently to the color line and is weighted based on distance to the color line and similarity to p. The standard bilinear-filter weights may be used, with the same weighting function w for spatial weighting and an exponential falloff with a sigma of 1.0 for range weighting. In one embodiment, the weighting function w is a simple unit "pyramid"-filter kernel. In other embodiments, other isotropic kernels are used for the weighting function. A large range sigma makes sure that only extreme outliers (e.g., decorrelated portion of the color and depth data) are excluded for the color line estimation. A fifth color line may be computed for the outliers using the per-pixel complementary confidence values $wc_i(i)=e^{-(\sigma_c^{-1}w_{sum}(j))^2}$.

The depth values for each block of pixels of the image may be reconstructed based on the color data, the sampled depth data $\hat{d}$, and residual depth values $\hat{d}^c$ that represent the decorrelated portion of depth data in each block of pixels.

Figure 3A:
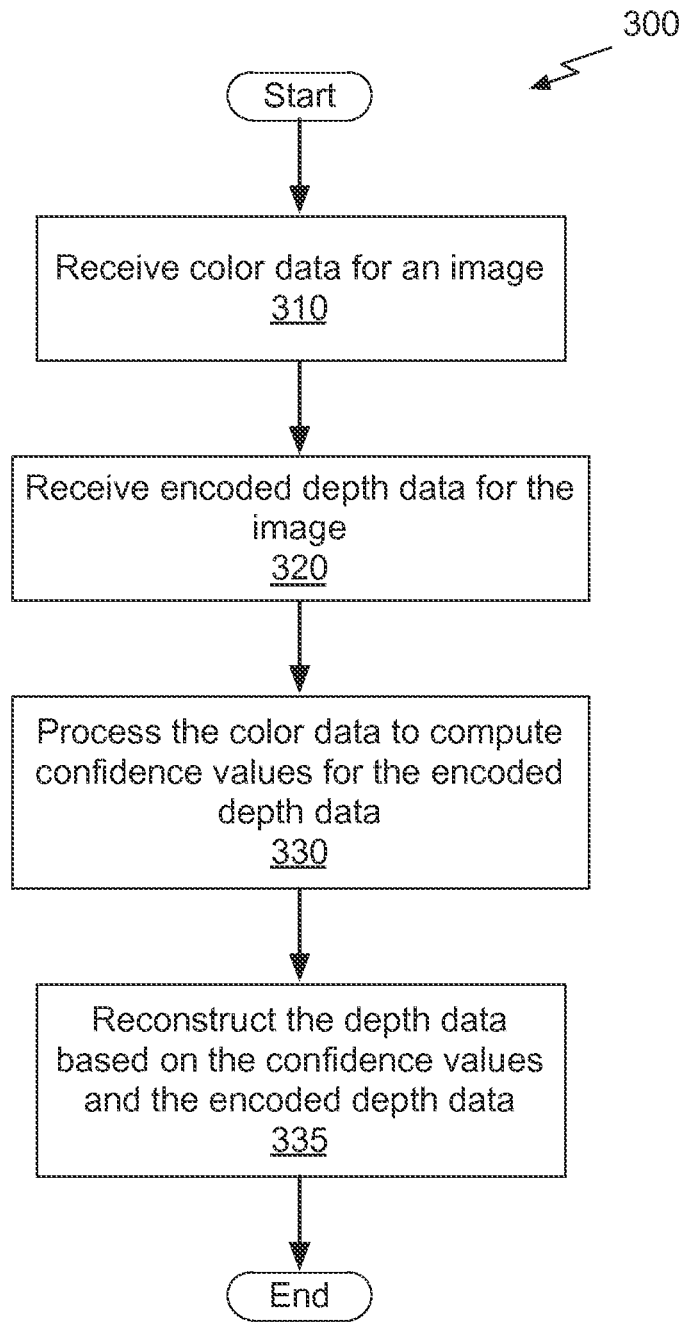
FIG. 3A illustrates a flowchart of a method for performing joint color and data decoding, in accordance with one embodiment.

FIG. 3A illustrates a flowchart of a method 300 for performing joint color and data decoding, in accordance with one embodiment. At operation 310, color data is received for an image. In one embodiment, the color data may be color data that has been compressed and then decompressed (when lossless compression is used) to reproduce the color data. At operation 320, encoded depth data is received for the image.

At operation 330, the color data is processed to compute confidence values $w_{sum}(j)$ for the encoded depth data. As previously explained, the confidence values may be used to compute the complementary confidence values $wc_i(j)$ that were used during encoding. The complementary confidence mask that was used to identify decorrelated pixels for a particular block during encoding may be regenerated to identify the same decorrelated pixels for the block during decoding. At operation 335, the depth data is reconstructed based on the spatial decorrelation data (e.g., confidence values, complementary confidence values, and/or the complementary confidence mask) and the encoded depth data.

In one embodiment, the depth data D may be reconstructed using only the sampled depth values without using the residual depth values $\hat{d}^c$. When the depth data D is reconstructed using only the sampled depth values without using the residual depth values, a block $D_i$ may be approximated by a reconstruction $D_i'$, which is defined via a weighted average of four pixel values $\hat{d}$ that are associated with the positions 201, 202, 203, and 204 of the block of pixels 200 ($D_i$). For every output pixel, the weights are recomputed based on weighting functions determining color similarity $h_p$ and spatial proximity (weighting function) w. In one embodiment, the reconstruction is defined by:

$$D_i'(j) = \frac{\sum_{p\in\Omega_i} w((p-i)-j/k) \cdot h_p(C_i(j)) \cdot \hat{d}(p)}{w_{sum}(j)},$$

where $\Omega_i:=\{i, i+(1,0), i+(0,1), i+(1,1)\}$ and $w_{sum}(j):=w((p-i)-j/k)\cdot h_p(C_i(j)), j\in\{(x,y)\in Z: 0\leq x<k \wedge 0\leq j<k\}$. Importantly, a complex definition of the range weighting $h_p$, estimates the likelihood that a given color belongs to the surface underneath pixel p.

The reconstruction may be modified to also use the residual depth values to reconstruct the depth data more accurately:

$$D_i^C(j) = \frac{w_{sum}(j)D_i'(j) + wc_i(j)\hat{d}^C(i)}{w_{sum}(j) + wc_i(j)},$$

where the residual depth values $\hat{d}^C$ are an additional image representing the decorrelated portion of the depth data that is encoded with $\hat{d}$ and $w_{ci}(j)$ is the complementary confidence values for each block of pixels. The optimal value of $\hat{d}^C(i)$ may be computed by minimizing the difference between the depth data and the reconstructed depth data. $|D_i - D_i^C|$.

It may be surprising that a low-resolution stream of encoded depth data is sufficient to reconstruct high-quality depth, yet it can be well motivated. For image/video coding the typical size of 8×8 pixels for a discrete cosine transform (DCT) block matches well the human visual system contrast sensitivity in color vision, which roughly ranges from 1 to 50 cpd (cycles per degree). A typical display device shows signals with up to 20 cpd. Therefore, an 8×8 pixel DCT block is best at encoding luminance in the range of 2.5 cpd corresponding to the lowest frequency AC coefficient (half a cycle per block) to 20 cpd (highest frequency AC coefficient). However, the HVS frequency-sensitivity to depth/disparity is much lower and ranges from 0.3 cpd to 5 cpd. Therefore, an 8-pixel-wide block not only encodes very low frequencies badly, but also wastes information by encoding frequencies above 5 cpd that do not improve the perceived stereo quality (when depth is used to produce stereo images). Consequently, it may be possible to downsample the depth image by a factor of k=4 before encoding the depth data, thereby targeting frequencies in the range from 0.625 to 5 cpd.

However, humans also tend to be sensitive to phase in the presence of edges. Therefore, similar to luminance, more precision is needed for isolated disparity edges. Therefore, the reconstructing of the encoded depth data using the confidence values improves the quality of the recovered depth data since the high-frequency depth edges may be recovered from the high-resolution color image. Furthermore, if depth edges are not matched by color edges in natural stereo images, the depth edges are unlikely to be perceived by a viewer.

Figure 3B:
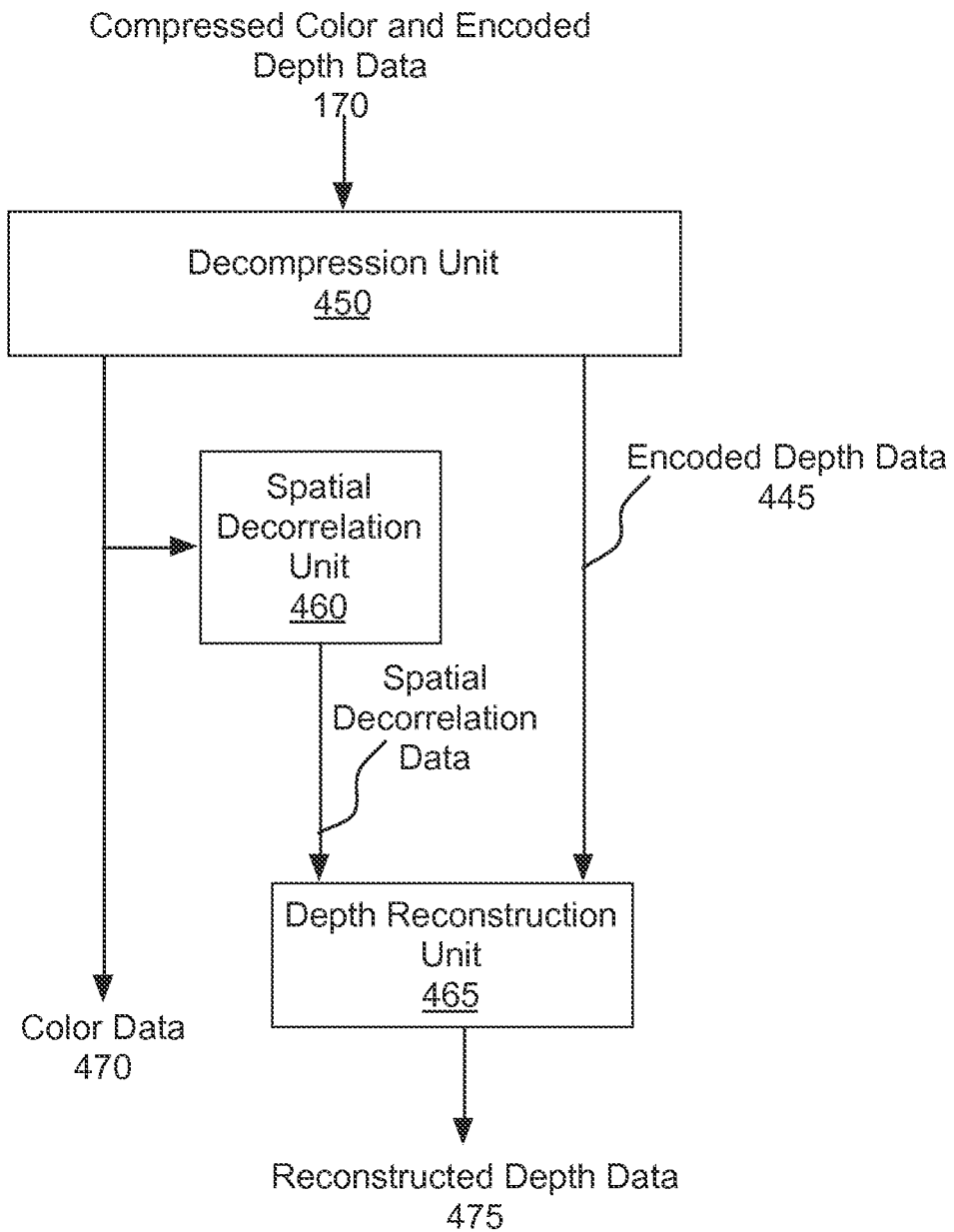
FIG. 3B illustrates a block diagram for performing joint color and data decoding, in accordance with one embodiment.

FIG. 3B illustrates a block diagram for performing joint color and data decoding, in accordance with one embodiment. A decompression unit 450 receives the compressed color and encoded depth data 170. In one embodiment, the decompression unit 450 is configured to decompress the depth portion of the compressed color and encoded depth data and output the encoded depth data including the sampled depth data (correlated portion of the depth data) and the residual depth values (decorrelated portion of the depth data) to a depth reconstruction unit 465. In one embodiment, the decompression unit 450 is configured to decompress the color portion of the compressed color and encoded depth data and output the color data 470. Persons skilled in the art will understand that one or more known decompression techniques may be employed by the decompression unit 450.

The color data 470 is processed by a spatial decorrelation unit 460 to produce spatial decorrelation data corresponding to the color data 470. In one embodiment, the spatial decorrelation data includes confidence values for the pixels in each block. In one embodiment, the spatial decorrelation data includes complementary confidence values indicating any pixels that have low confidence values. Importantly, in one embodiment, the spatial decorrelation data is generated using only the color data. The complementary confidence mask corresponding to the complementary confidence values indicates pixels whose color or depth value cannot be accurately reconstructed from the sampled color or depth data, respectively.

The depth reconstruction unit 465 receives the encoded depth data from the decompression unit 450 and spatial decorrelation data corresponding to the color data from the spatial decorrelation unit 460. The depth reconstruction unit 465 computes the representative decorrelated depth value and reconstructed depth values for pixels. The depth reconstruction unit 465 outputs the reconstructed depth values 475.

One or more of the decompression unit 450, spatial decorrelation unit 460, and depth reconstruction unit 465 may be included within a processing unit. The functions performed by one or more of the decompression unit 450, spatial decorrelation unit 460, and depth reconstruction unit 465 may by performed by a general purpose processing unit or dedicated circuitry. One or more of the color data 470, reconstructed depth data 475, encoded depth data, sampled depth data, spatial decorrelation data, and compressed color and encoded depth data 170 may be stored in a memory.

Figure 4:
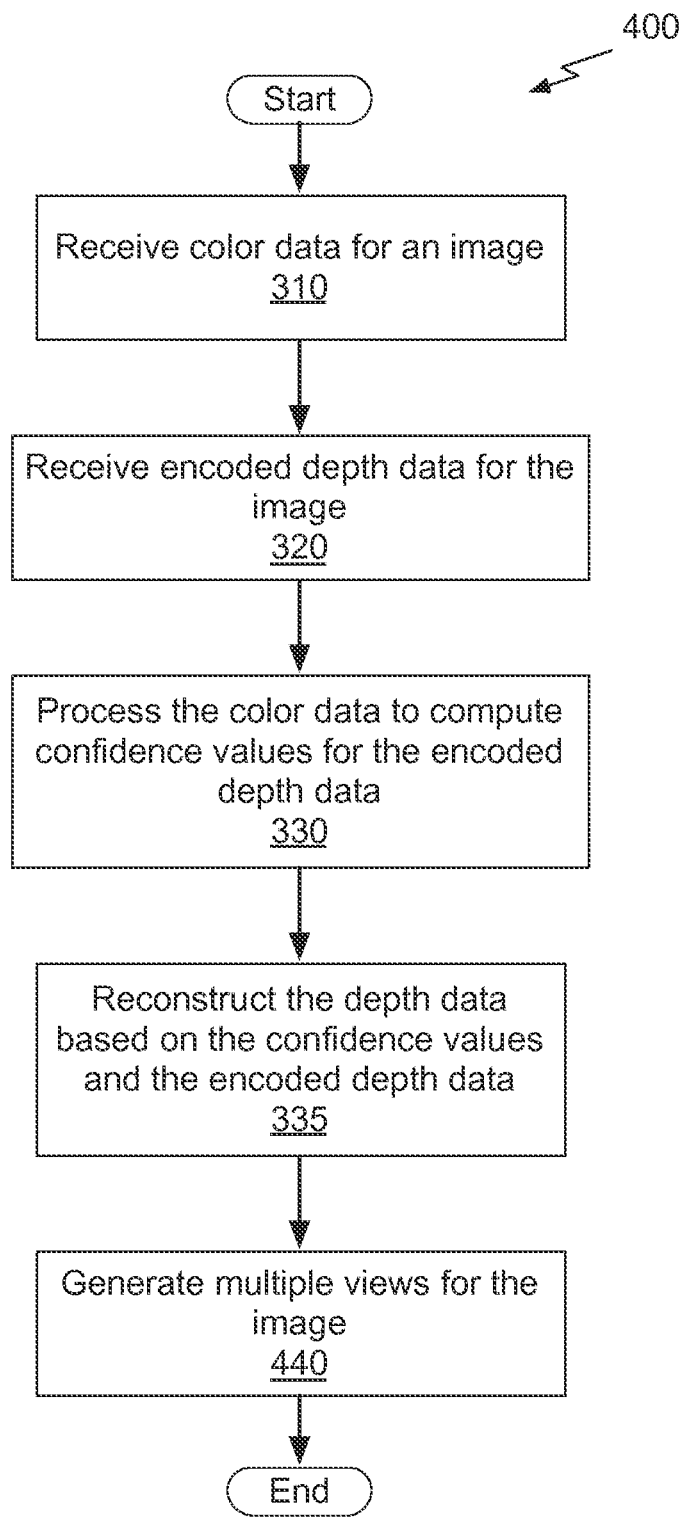
FIG. 4 illustrates a flowchart of a method for performing joint color and data decoding to generate multiple views of an image, in accordance with one embodiment.

FIG. 4 illustrates a flowchart of a method 400 for performing joint color and data decoding to generate multiple views of an image, in accordance with one embodiment. Operations 310, 320, 330, 335 are performed as previously described in conjunction with FIG. 3A. When stereo viewing applications are supported, multiple views are needed for each image. Existing systems may encode multiple views for each image and the view that is best suited to the viewing environment may be decoded for display. The viewing environment may include one or more of the resolution and/or screen size of the viewing device, the viewing distance, characteristics of the viewer (e.g., distance between eyes), content (e.g., extent of the scene and visible objects), and the like. Representing the depth data as per-pixel vergence angles allows for the construction of multiple views using the reconstructed depth data. At operation 440, multiple views for stereo applications (e.g., 3DTV) are generated for the image using the reconstructed depth data. The multiple views for an image may be generated using a single reconstructed depth data corresponding to the image. Therefore, the bandwidth requirements for the encoded color and depth data are reduced compared with transmitting multiple views of the image.

The encoding technique described in conjunction with FIGS. 1A, 1B, 2A, 2B, and 2C represents high quality depth data. The color-based depth reconstruction that is used to reconstruct the depth data is robust even for larger subsampling ratios (e.g., k=16). Also, the sampled depth data may be efficiently compressed. The depth encoding technique may be integrated into existing encoders to improve compression ratios and the quality of reconstructed depth data for images.

Figure 5:
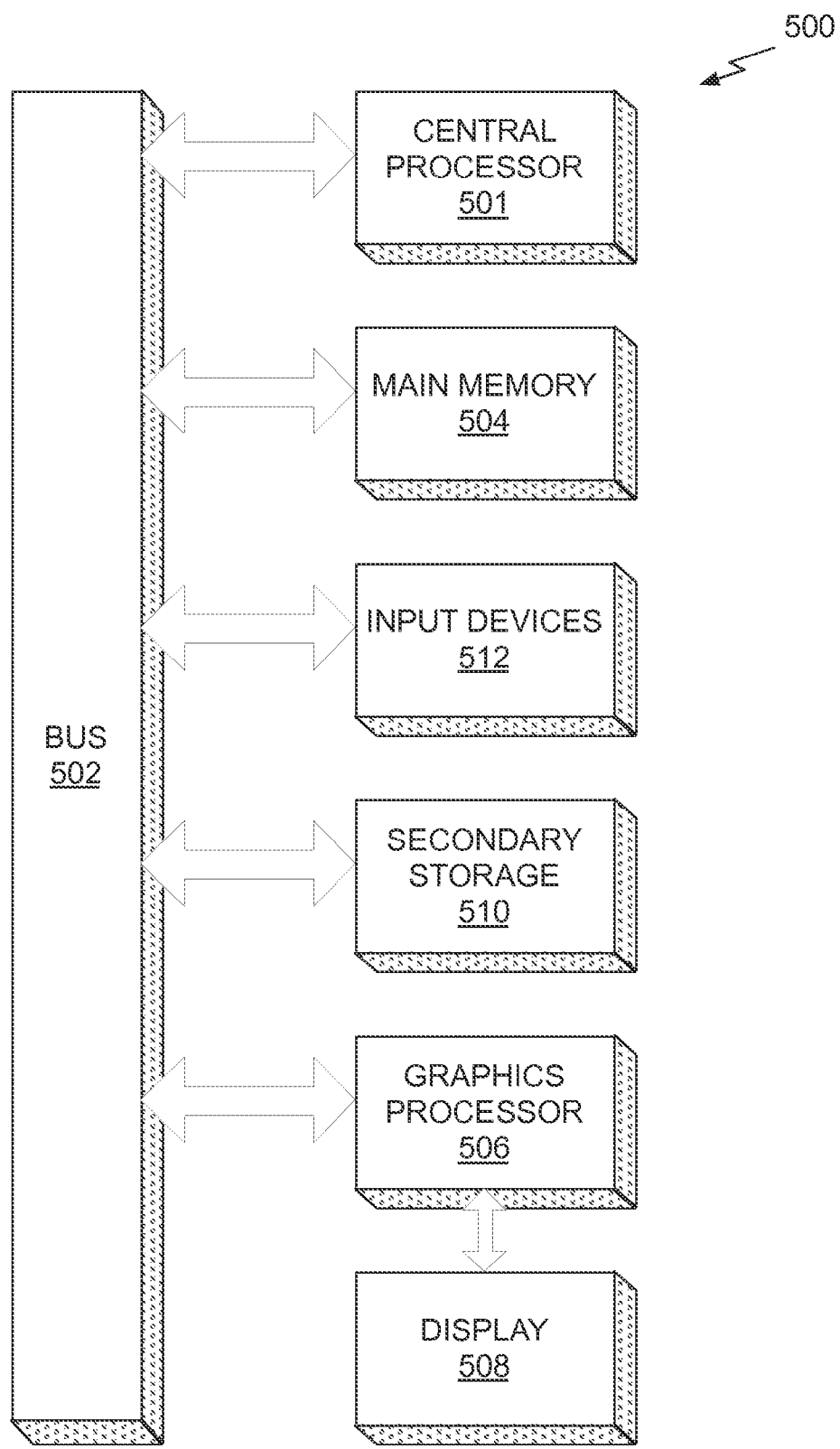
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one central processor 501 that is connected to a communication bus 502. The communication bus 502 may be implemented using any suitable protocol, such as PCI (Peripheral Component Interconnect), PCI-Express, AGP (Accelerated Graphics Port), HyperTransport, or any other bus or point-to-point communication protocol(s). The system 500 also includes a main memory 504. Control logic (software) and data are stored in the main memory 504 which may take the form of random access memory (RAM).

The system 500 also includes input devices 512, a graphics processor 506, and a display 508, e.g., a conventional CRT (cathode ray tube), LCD (liquid crystal display). LED (light emitting diode), plasma display or the like. User input may be received from the input devices 512, e.g., keyboard, mouse, touchpad, microphone, and the like. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 504 and/or the secondary storage 510. Such computer programs, when executed, enable the system 500 to perform various functions. The main memory 504, the storage 510, and/or any other storage are possible examples of computer-readable media.

In one embodiment, the architecture and/or functionality of the various previous figures may be implemented in the context of the central processor 501, the graphics processor 506, an integrated circuit (not shown) that is capable of at least a portion of the capabilities of both the central processor 501 and the graphics processor 506, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, laptop computer, server, workstation, game consoles, embedded system, and/or any other type of logic. Still yet, the system 500 may take the form of various other devices including, but not limited to a personal digital assistant (PDA) device, a mobile phone device, a television, etc.

Further, while not shown, the system 500 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving color data for an image;
receiving depth data for the image;
computing confidence values for the depth data based on the color data;
computing, based on the confidence values, complementary confidence values corresponding to a decorrelated portion of the depth data;
determining a representative decorrelated depth value corresponding to the decorrelated portion of the depth data; and
computing a residual value as a difference between the representative decorrelated depth value and a sampled depth value for a block of pixels within the image; and
encoding the depth data based on the confidence values to represent a correlated portion of the depth data and the decorrelated portion of the depth data.

2. The method of claim 1, wherein the confidence values indicate correlations between the depth data and a sampled depth value for each pixel of the image.

3. The method of claim 1, wherein encoding the depth data further comprises inserting the residual value into a first component channel and inserting the sampled depth value into a second component channel.

4. The method of claim 1, wherein the depth data comprises per-pixel vergence angles.

5. The method of claim 1, wherein the color data is represented in an opponent color space.

6. The method of claim 1, further comprising compressing the encoded depth data.

7. The method of claim 1, wherein computing confidence values comprises:
mapping the color data to a color space; and
computing a first eigenvector over a weighted pixel distribution in the color space as a color line associated with a correlated portion of the color data.

8. The method of claim 7, further comprising computing an additional color line corresponding to a decorrelated portion of the color data.

9. The method of claim 1, further comprising determining, based on the confidence values, a complementary confidence mask that indicates pixels in a block of pixels that are decorrelated based on the color data.

10. A method, comprising:
receiving color data for an image;
receiving encoded depth data that represents a correlated portion of depth data and a decorrelated portion of the depth data for the image;
computing confidence values for the encoded depth data based on the color data;
computing, based on the confidence values, complementary confidence values corresponding to the decorrelated portion of the depth data; and
determining a representative decorrelated depth value corresponding to the decorrelated portion of the depth data based on a residual value that represents the decorrelated portion of the depth data and a sampled depth value that represents the correlated portion of the depth data for a block of pixels within the image; and
reconstructing the depth data based on the confidence values and the encoded depth data.

11. The method of claim 10, wherein the confidence values indicate correlations between the color data and sampled color data for each pixel of the image.

12. The method of claim 10, wherein the residual value is included in a first component channel of the encoded depth data and the sampled depth data is included in a second component channel of the encoded depth data.

13. The method of claim 10, wherein the reconstructed depth data comprises per-pixel vergence angles.

14. The method of claim 10, wherein the color data is represented in an opponent color space.

15. The method of claim 10, wherein computing confidence values comprises:
mapping the reconstructed color data to a color space; and
computing a first eigenvector over a weighted pixel distribution in the color space as a color line associated with a correlated portion of the color data.

16. The method of claim 15, further comprising computing an additional color line corresponding to a decorrelated portion of the color data.

17. The method of claim 10, further comprising determining, based on the confidence values, a complementary confidence mask that indicates pixels in a block of pixels that are decorrelated based on the color data.

18. A system, comprising:
a memory configured to store color data for an image and depth data for the image; and
a processing unit coupled to the memory and configured to:
receive the color data for the image;
receiving the depth data for the image;
compute confidence values for the depth data based on the color data;
compute, based on the confidence values, complementary confidence values corresponding to a decorrelated portion of the depth data;

determine a representative decorrelated depth value corresponding to the decorrelated portion of the depth data; and compute a residual value as a difference between the representative decorrelated depth value and a sampled depth value for a block of pixels within the image; and encode the depth data based on the confidence values to represent a correlated portion of the depth data and the decorrelated portion of the depth data.

* * * * *